Patented July 4, 1950

2,513,429

UNITED STATES PATENT OFFICE 2,513,429

ROSIN AMMONIUM PHENOXIDES AS FUNGICIDES

Ronald Rosher, Wilmington, Del., assignor to Hercules Powder Company, Wilmington, Del., a corporation of Delaware No Drawing. Application July 16, 1948, Serial No. 39,185

20 Claims. (Cl. 117—138.5)

This invention relates to novel derivatives of rosin amines. More particularly, it relates to novel rosin ammonium phenoxides and fungicidal compositions containing the same.

Phenols and particularly the halogen and nitrosubstituted phenols and their salts are well known as constituents of fungicidal compositions. The free phenols have the disadvantage of volatility and crystallinity which aids in their loss by "blooming" and subsequent evaporation from the surface of materials which they have been used to treat. Moreover, in the case of wood surfaces where "blooming" takes place, adhesion of paint to such surfaces is greatly decreased. Salts of the phenols have generally had the disadvantage of solubility in water which aided in their loss by leaching when exposed to water. Crystalline salts, moreover, have the disadvantage of blooming by crystallizing on the surface of treated materials, thereby reducing their effective toxicity.

Now, in accordance with this invention, it has been found that rosin ammonium phenoxides produced by reaction between rosin amines and phenols are novel compounds which do not have the disadvantages of prior phenols and salts thereof and have, moreover, surprisingly good fungicidal properties. While the fungicidal activity of the rosin ammonium phenoxides varies according to the phenol from which the novel rosin ammonium phenoxides are made, the fungicidal activity is, in general, much greater than that of the phenol itself or the rosin amine from which it is prepared.

The following examples are illustrative of the rosin ammonium phenoxides as fungicides. All percentages and parts are by weight unless otherwise indicated.

Example I

Strips of bleached muslin 4 by 7 inches with the long dimension parallel to the warp were washed with gasoline having a narrow boiling range, dried, and weighed. The strips were then dipped into 4% solutions of the fungicides designated hereinafter, squeezed, dried, and weighed. The treated strips were then buried for 2 weeks in moist mushroom soil. An untreated strip of muslin was completely disintegrated by storage in the mushroom soil for this period.

The treated samples taken from the mushroom soil were tested for breaking strength on a Scott Tensile Machine, using a pull of 12 inches per minute with 3 inches of cloth between the jaws and using a 300-pound load. Untreated cloth which had not been exposed to the mushroom soil had an average breaking strength of 53 pounds. A sample cloth having 3.4% dehydrogenated rosin ammonium pentachlorophenoxide deposited therein, after being taken from the mushroom soil, had a breaking strength (average of 6 samples) of 53 pounds. Another sample of muslin having 1.1% dehydrogenated rosin ammonium pentachlorophenoxide deposited therein had a breaking strength, after being removed from the mushroom soil, of 52 pounds (average of 6 samples). Muslin samples which had deposited therein 3.6% dehydrogenated rosin amine showed a breaking strength lower than that of the original untreated cloth when taken from the mushroom soil. Similarly, a sample of muslin cloth having deposited therein 3.3% pentachlorophenol had, after removal from the mushroom soil, only about 80% of the breaking strength of the untreated cloth.

The above tests were repeated using another sample of muslin. The average breaking strength of such strips before treatment or subjection to the action of fungi in mushroom soil was about 145 pounds. A sample of cloth having deposited therein 2.05% dehydrogenated rosin ammonium pentachlorophenoxide had a breaking strength of 140 pounds after 2 weeks' burial in moist mushroom soil. Samples of the same cloth having about the same amount of dehydrogenated rosin amine deposited therein after the 2-week burial period in mushroom soil had about 93% of the breaking strength of the sample which had been treated with dehydrogenated rosin ammonium pentachlorophenoxide. Another sample of cloth having about 2% pentachlorophenol deposited therein had, after the 2-week burial period in mushroom soil, only about 82% of the breaking strength of the sample of cloth which had been treated with dehydrogenated rosin ammonium pentachlorophenoxide.

Example II

Tests similar to those of Example I were carried out on a sample of cloth having an average breaking strength of 125 pounds. Samples of cloth were treated with hydrogenated rosin ammonium trichlorophenoxide in an amount sufficient to increase the weight of the cloth 1.19%. The breaking strength of the treated samples after the 2-week burial test showed an average breaking strength of 115 pounds. Control samples containing trichlorophenol and samples containing hydrogenated rosin amine in similar amounts gave lower breaking strengths after the burial tests.

Example III

Samples of cloth having an average breaking strength of 125 pounds were treated with sufficient dehydroabietyl ammonium tetrachlorophenoxide to increase the weight of the cloth 2.12%. Samples of cloth so treated and subjected to the burial test described in Example I had an average breaking strength of 99. Control samples of cloth treated with dehydroabietyl amine and control samples treated with tetrachlorophenol in amounts sufficient to increase the weight of the cloth about 2% showed lower breaking strengths after the burial tests described in Example I.

Example IV

Samples of cloth having an average breaking strength of 125 pounds were treated with hydrogenated rosin ammonium pentachlorophenoxide in an amount sufficient to increase the weight of the cloth 2.44%. The average breaking strength of the samples of cloth, after subjection to the burial tests, then had an average breaking strength of 115 pounds. Control samples containing about 2% hydrogenated rosin amine and control samples containing about 2% pentachlorophenol had much lower breaking strengths after subjection to the burial tests.

Example V

A sample of cloth having a breaking strength of 150–155 pounds was impregnated with 1.63% monoethanol rosin ammonium pentachlorophenoxide. The breaking strength of the cloth so treated after a 2-week burial period showed a breaking strength of about 146.5. Another sample of the same cloth impregnated with 2.48% monoethanol rosin ammonium pentachlorophenoxide showed a breaking strength after the 2-week burial period of 147.5 pounds.

Further tests on rosin ammonium phenoxides prepared from various rosin amines and various phenols indicate that rosin ammonium phenoxides, in general, have powerful fungicidal action and the tests indicate further that the rosin ammonium phenoxides have a greater activity than either the rosin amine or the phenol from which they are derived, taken separately.

Examples of the rosin amines which form the rosin ammonium phenoxides of this invention include the rosin amines made from wood or gum rosin or various modified wood or gum rosins, such as dehydrogenated (disproportionated) rosin, hydrogenated rosin, or polymerized rosin. These rosin amines correspond to the related rosin acids in that they have similar carbon skeletons and they differ in that the rosin amines have a —CH₂NH₂ group in place of the —COOH group of the rosin acids. The rosin amines may also be the amines derived from the pure rosin acids in which abietyl amine is the amine derived from abietic acid, dehydroabietyl amine is the amine derived from dehydroabietic acid, dihydroabietyl amine is the amine derived from dihydroabietic acid, and tetrahydroabietyl amine is the amine derived from tetrahydroabietic acid. In the rosin art, it is customary to use the term "abietic acid" as equivalent to rosin, "dehydroabietic acid" as equivalent to dehydrogenated rosin, etc. Similarly, abietyl amine is used in this specification as an equivalent of rosin amine, dehydroabietyl amine is used as an equivalent of dehydrogenated rosin amine, hydroabietyl amine is used as an equivalent of hydrogenated rosin amine, etc., the distinction between the equivalents in each case being one of degree of purity. The term "stabilized rosin amine" is used to designate dehydroabietyl amine, dihydroabietyl amine, tetrahydroabietyl amine, and polymerized rosin amine. The stabilized rosin amines thus have the same type of ring structure as the stabilized rosin acids. The structure of these amines will be brought out more clearly hereinafter.

The rosin ammonium phenoxides of this invention are also made from secondary and tertiary rosin amines having ring structures similar to those rosin amines described above. Examples of these secondary and tertiary rosin amines are those in which the hydrogens attached to the nitrogen are replaced by lower alkyl and alkylol groups. The following examples are secondary and tertiary amines derived from dehydroabietic acid or dehydrogenated rosin: Methyl dehydroabietyl amine, ethyl dehydroabietyl amine, dimethyl dehydroabietyl amine, diethyl dehydroabietyl amine, isopropyl dehydroabietyl amine, butyl dehydroabietyl amine, hydroxymethyl dehydroabietyl amine, hydroxyethyl dehydroabietyl amine, and di(hydroxyethyl) dehydroabietyl amine. Similar secondary and tertiary rosin amines having the nucleus of abietic acid, dihydroabietic acid, tetrahydroabietic acid, and polymerized abietic acid are included within the scope of this invention.

The secondary and tertiary rosin amines may be prepared by reacting the corresponding rosin amine with an alkyl halide or sulfate or by simultaneous condensation and reduction of the rosin amine and an aldehyde or ketone. The secondary and tertiary alkanol amines may be prepared by reacting the rosin amine with a suitable epoxide such as ethylene oxide, etc., or by reacting the rosin amine with a chlorohydrin.

The rosin ammonium phenoxides of this invention include also the quaternary ammonium phenoxides of the rosin amines, such as the trialkyl, trialkanol, and dialkyl aralkyl rosin ammonium phenoxides. Typical of these quaternary rosin ammonium phenoxides which have fungicidal activity are trimethyl dehydroabietyl ammonium phenoxide, dimethyl benzyl dehydroabietyl ammonium phenoxide, dimethyl allyl dehydroabietyl ammonium phenoxide, dimethyl methoxymethyl dehydroabietyl ammonium phenoxide, dimethyl β-hydroxyethyl dehydroabietyl ammonium phenoxide, etc., and the corresponding abietyl and hydroabietyl and polyabietyl ammonium phenoxides. These quaternary rosin ammonium phenoxides may be prepared by addition of an alkyl, alkenyl, or aralkyl halide to a tertiary rosin amine or by the reaction of a halohydrin such as ethylene bromohydrin with a tertiary rosin amine and subsequently treatment with a metal phenoxide such as sodium phenoxide, sodium pentachlorophenoxide, or the like. Likewise, the quaternary rosin ammonium hydroxide may be first prepared and subsequently reacted with the free phenol.

The term "rosin ammonium phenoxide" is used to include those phenoxides derived from the primary, secondary, or tertiary rosin amines and the quaternary rosin ammonium compounds of the types disclosed above.

The primary rosin amines which are used as the starting material for preparing the secondary and tertiary rosin amines and the quaternary rosin ammonium compounds are prepared by reacting the corresponding rosin or rosin acid with ammonia to form the nitrile and then hydrogenating the nitrile to form the amine. The preparation of the nitrile may be carried out by passing gaseous ammonia into the molten rosin material and vaporizing the water as fast as it is formed in order to remove the water from the reaction mixture. Dehydration catalysts may be used in this reaction if desired. The nitrile is preferably purified by neutralization or distillation before subjecting it to hydrogenation to prepare the amine, as the presence of acidic materials frequently destroys the hydrogenation catalyst. As examples of this reaction, abietic acid is converted to abietonitrile, dehydroabietic acid is converted to dehydroabietonitrile, dihydroabietic acid is converted to dihydroabietonitrile, etc.

The resin acid nitriles may be hydrogenated to the amine with or without a solvent using hydrogen under pressure with a hydrogenation catalyst. Various catalysts may be used such as active base metal catalysts including nickel, cobalt, Raney nickel, and Raney cobalt, or such as noble metal catalysts including active platinum, palladium, palladium on carbon, or reduced platinum oxide. The reaction is usually carried out under pressure of 200 to 8000 pounds per square inch and at a temperature of from about 20° C. to about 200° C. In this hydrogenation reaction, the nitrile group is so readily hydrogenated that the hydrogenation does not normally affect the nuclear unsaturation of the rosin acid nitrile. Thus, abietonitrile is hydrogenated to abietyl amine, dehydroabietonitrile is hydrogenated to dehydroabietyl amine, etc.

The phenols which react with the rosin amines to form the rosin ammonium phenoxides of this invention are simple phenols or substituted phenols. Thus, rosin ammonium phenoxides are made from phenol, alkylated phenols such as menthyl phenol and β-naphthol, cumyl phenol, cresol, xylol, menthol, chlorinated phenols such as monochlorophenol, dichlorophenol, trichlorophenol, tetrachlorophenol, pentachlorophenol, and chlorocresols, nitrated phenols such as mononitrophenol, dinitrophenol, trinitrophenol, and nitrocresols, and the like. While all salt-forming substituted phenols are included in the scope of this invention, those having only one salt-forming group are preferred.

The rosin ammonium phenoxides are prepared by mixing the amine and the phenol together in the presence or absence of a solvent. While it is preferable to prepare the rosin ammonium phenoxide by mixing equimolecular amounts of the rosin amine and the phenol, either an excess of the phenol or of the rosin amine may be used. However, since the rosin ammonium phenoxide is generally more satisfactory in all of its physical properties and in its toxicity toward fungi, it is preferable to use the equimolecular ratio. They may also be prepared by mixing a salt of the amine and an acid with a metal salt of the phenol. An example of this latter method of preparation is the reaction of a dimethylbenzyl rosin ammonium chloride with sodium phenoxide. In the reaction between the amine and a phenol, heat is frequently evolved, indicating chemical reaction, but the rosin ammonium phenoxides of this invention were formed in certain cases without evolution of a detectable amount of heat.

The rosin ammonium phenoxides of this invention may be used for inhibiting fungicidal action in all sorts of materials subject to such action. Thus, they may be used for treating of canvas and other textiles, wood, rope, leather, paper, etc. The amount of rosin ammonium phenoxide necessary for inhibiting fungicidal attack will, in general, be less than about 3%. Only a sufficient amount to inhibit attack is necessary, however, and, in those cases where uniform distribution has been obtained, as little as 0.01% has been found to be highly effective. They may be incorporated into these materials by direct application or by use of a solvent. They have the particular advantage for use in solvents in that they have a fairly high solubility. The rosin ammonium pentachlorophenoxides, for example, have much higher solubility than does pentachlorophenol in the usual solvents. Solvents which may be used include aromatic and aliphatic hydrocarbons, such as kerosene, mineral oil, lubricating oil, naphtha, and the like. They may also be used in such solvents as acetone and alcohol. The rosin ammonium phenoxides may also be used for application in emulsions or as constituents of protective coatings such as paints.

The rosin ammonium phenoxides besides having the favorable characteristic of solubility also have the characteristic of being resinous which is advantageous in that the product does not tend to crystallize. Thus, rosin ammonium pentachlorophenoxide does not give trouble with "blooming," "bleeding," or "crystallizing" as does pentachlorophenol itself. The rosin ammonium phenoxides of this invention are thus superior in many ways to either the rosin amines or the phenols from which they are derived.

What I claim and desire to protect by Letters Patent is:

1. A rosin ammonium phenoxide in which the rosin nucleus is unsubstituted.
2. A rosin ammonium nitrophenoxide in which the rosin nucleus is unsubstituted.
3. A rosin ammonium chlorophenoxide in which the rosin nucleus is unsubstituted.
4. A rosin ammonium polychlorophenoxide in which the rosin nucleus is unsubstituted.
5. A rosin ammonium pentachlorophenoxide in which the rosin nucleus is unsubstituted.
6. A stablized rosin ammonium phenoxide in which the rosin nucleus is unsubstituted.
7. A dehydrogenated rosin ammonium phenoxide in which rosin nucleus is unsubstituted.
8. A dehydroabietyl ammonium phenoxide in which the dehydroabietyl radical is unsubstituted.
9. A dehydroabietyl ammonium pentachlorophenoxide in which the dehydroabietyl radical is unsubstituted.
10. Dimethyl dehydroabietyl ammonium pentachlorophenoxide.
11. A hydroxyethyl dehydroabietyl ammonium phenoxide in which the dehydroabietyl radical is unsubstituted.
12. Dimethyl benzyl dehydroabietyl ammonium pentachlorophenoxide.
13. A material, normally subject to attack by fungi, provided with a small amount of the product of claim 1, said product being uniformly applied to the material in an amount sufficient to inhibit attack by fungi, said amount being by weight within the range of 0.01 and 3.0% based upon the weight of the untreated material.
14. A material, normally subject to attack by fungi, provided with a small amount of the product of claim 2, said product being uniformly applied to the material in an amount sufficient to inhibit attack by fungi, said amount being by weight within the range of 0.01 and 3.0% based upon the weight of the untreated material.
15. A material, normally subject to attack by fungi, provided with a small amount of the product of claim 3, said product being uniformly applied to the material in an amount sufficient to inhibit attack by fungi, said amount being by weight within the range of 0.01 and 3.0% based upon the weight of the untreated material.

16. A material, normally subject to attack by fungi, provided with a small amount of the product of claim 4, said product being uniformly applied to the material in an amount sufficient to inhibit attack by fungi, said amount being by weight within the range of 0.01 and 3.0% based upon the weight of the untreated material.

17. A material, normally subject to attack by fungi, provided with a small amount of the product of claim 5, said product being uniformly applied to the material in an amount sufficient to inhibit attack by fungi, said amount being by weight within the range of 0.01 and 3.0% based upon the weight of the untreated material.

18. A material, normally subject to attack by fungi, provided with a small amount of the product of claim 6, said product being uniformly applied to the material in an amount sufficient to inhibit attack by fungi, said amount being by weight within the range of 0.01 and 3.0% based upon the weight of the untreated material.

19. A material, normally subject to attack by fungi, provided with a small amount of the product of claim 8, said product being uniformly applied to the material in an amount sufficient to inhibit attack by fungi, said amount being by weight within the range of 0.01 and 3.0% based upon the weight of the untreated material.

20. A material, normally subject to attack by fungi, provided with a small amount of the product of claim 9, said product being uniformly applied to the material in an amount sufficient to inhibit attack by fungi, said amount being by weight within the range of 0.01 and 3.0% based upon the weight of the untreated material.

RONALD ROSHER.

REFERENCES CITED

The following references are of record in the file of this patent:

UNITED STATES PATENTS

| Number | Name | Date |
|---|---|---|
| 102,450 | Torrey | Apr. 26, 1870 |